H. BAUSCH.
ADJUSTMENT FOR TELESCOPES.
APPLICATION FILED OCT. 10, 1905.

975,672.

Patented Nov. 15, 1910.
2 SHEETS—SHEET 1.

Witnesses
Walter B. Payne
Clarence A. Bateman

Inventor
Henry Bausch
By his Attorney

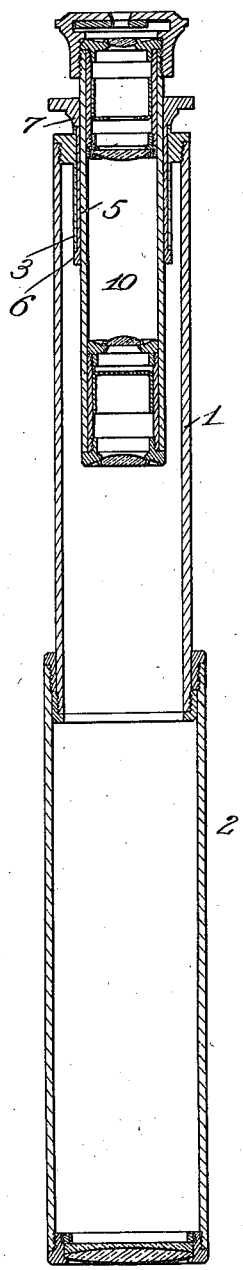

UNITED STATES PATENT OFFICE.

HENRY BAUSCH, OF ROCHESTER, NEW YORK, ASSIGNOR, BY MESNE ASSIGNMENTS, TO BAUSCH & LOMB OPTICAL COMPANY, (NO. 2,) A CORPORATION OF NEW YORK.

ADJUSTMENT FOR TELESCOPES.

975,672.

Specification of Letters Patent.    Patented Nov. 15, 1910.

Application filed October 10, 1905. Serial No. 282,039.

*To all whom it may concern:*

Be it known that I, HENRY BAUSCH, of Rochester, in the county of Monroe and State of New York, have invented certain new and useful Improvements in Adjustments for Telescopes; and I do hereby declare the following to be a full, clear, and exact description of the same, reference being had to the accompanying drawings, forming a part of this specification, and to the reference-numerals marked thereon.

My present invention relates to improvements in focusing devices for telescopes and similar instruments, and the purpose of the invention is to provide an improved fine adjustment for the eyepiece of telescopes which is so constructed that the optical centers of the lens system of the eyepiece and the lens elements of the main tube will be maintained accurately in alinement at all relative adjustments of the tube and eyepiece.

To these and other ends my invention consists in certain improvements and combinations of and arrangements of parts to be hereinafter described, the novel features being pointed out particularly in the claims hereunto annexed.

Figure 1:
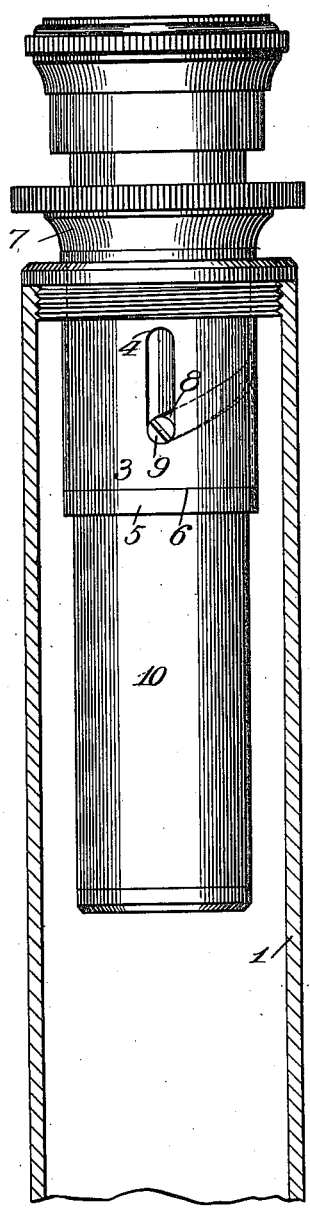
Figure 2:
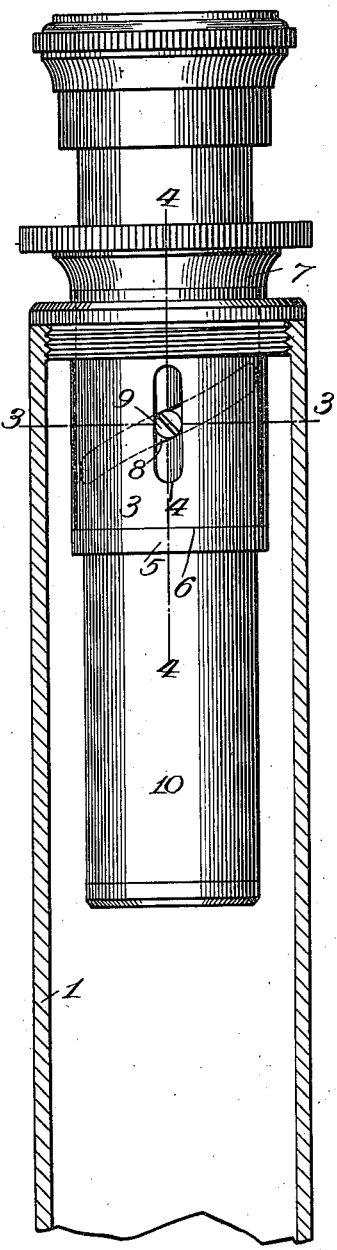
Figure 3:
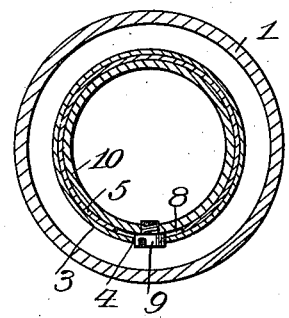
Figure 4:
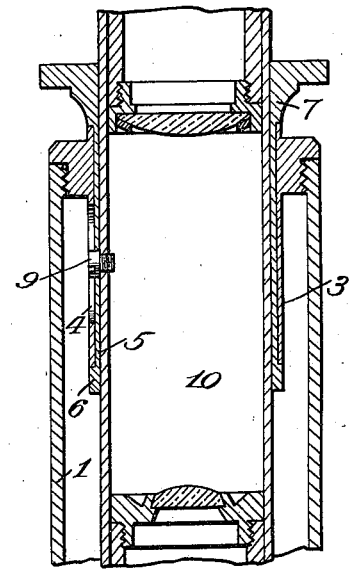

In the drawing: Figure 1 is a sectional view of a telescope draw tube, showing my invention applied thereto. Fig. 2 is a view similar to Fig. 1, the eyepiece being shown partially withdrawn from the tube. Fig. 3 represents a section on the line 3—3 of Fig. 2. Fig. 4 represents a section on the line 4—4 of Fig. 2, and Fig. 5 is a sectional view of a telescope, showing my improvements applied thereto.

The same numerals designate similar parts in the several views.

Although my invention is applicable generally to optical instruments of various kinds requiring a lens adjustment for focusing purposes, it is particularly adapted to the fine adjustment for the eyepieces of telescopes, and in the accompanying drawings it has been so shown, 1 designating the rear draw tube of a telescope 2, the telescope tubes being provided with the usual lens elements arranged with their optical axes in alinement. At the rear end of the tube 1 is fitted a non-revoluble sleeve 3 having a slot 4 formed therein and arranged axially of the telescope, and a revoluble sleeve 5 is fitted within sleeve 3, an annular shoulder 6 being formed at one end and a rim 7 at the opposite end to coöperate with the respective ends of outer sleeve 3 to prevent relative axial motion, the rim 7 being preferably formed to serve as an operating ring for the operator's fingers. The revoluble sleeve 5 has a helical slot or cam 8 formed in its walls, and resting in the slots 4 and 8 respectively of the outer and inner sleeves is a screw or radial projection 9 carried by the eyepiece tube 10, the latter being movable axially of the inner sleeve 5, and provided with the lenses comprising the lens system of the eyepiece.

By such construction and arrangement, the projection 9 of the eyepiece tube will engage in the axially-arranged slot 4 of the non-revoluble sleeve 3 to prevent rotation of the eyepiece tube and permit it to move axially of the telescope, and as this projection coöperates with the cam slot 8 of the revoluble sleeve 5, rotation of the latter will reciprocate the projection 9 longitudinally of slot 4, causing the tube of the eyepiece to move in a direction axially of the sleeves.

Thus it will be understood that the telescope eyepiece does not revolve but has only an axial motion with respect to the telescope, and therefore when the lenses of the system have been once mounted with their optical axes in alinement, their centers will be accurately maintained in alinement at all adjustments of the eyepiece, as the latter moves precisely in the line of the lens centers, and this is particularly important in transits, and other instruments employed for accurately measuring angles, distances, etc., wherein it is essential that the optical axis of the telescope should be perfectly maintained relatively to the mounting and its scales, for it will be understood that deviations in the optical axis of the telescope would introduce errors into the readings of the instrument.

I claim as my invention:

1. The combination with a telescope, of a non-rotatable eyepiece mounted to operate longitudinally thereof, a rotatable adjusting device surrounding the eyepiece for operating it and a guiding portion surrounding the adjusting device and adapted for attachment to the telescope.

2. In a telescope, the combination with the tube or casing, and a longitudinally movable eyepiece carried thereby, of an attaching portion within the telescope tube for preventing rotation of the eyepiece, and a rotatable adjusting device working within said attaching portion for moving the eyepiece longitudinally of the telescope.

3. The combination with a telescope having a portion extending into the telescope tube and provided with an axially arranged slot, and an eyepiece having a projection thereon coöperating with said slot, of an adjusting device inclosed within said portion for operating the eyepiece axially of the telescope.

4. The combination with a telescope having a sleeve suitably attached thereto and provided with an axially-arranged slot, and an eyepiece having a projection coöperating with said slot, of a rotatable adjusting device inclosed by said sleeve and having a cam thereon coöperating with the projection of the eyepiece for adjusting the latter axially of the telescope.

5. The combination with a telescope, a portion adapted to be attached thereto and provided with an axially-arranged slot, and an eyepiece having a projection coöperating with said slot, of a rotatable adjusting device fitted to operate within the said attaching portion and having a helical slot coöperating with the projection of the eyepiece for adjusting the latter axially of the telescope.

6. The combination with a telescope, of a non-rotatable sleeve carried thereby provided with a slot arranged axially of the telescope, a rotatable sleeve fitted to turn in the first-mentioned sleeve and having a helical slot therein, and an eyepiece having a projection thereon coöperating with the slots of the sleeves.

7. The combination with a telescope, of a sleeve removably fitted therein having a slot arranged axially of the telescope, a non-rotatable eyepiece having a projection coöperating with the said slot, and a rotatable adjusting device journaled to turn in said sleeve for moving the eyepiece axially of the telescope.

HENRY BAUSCH.

Witnesses:
 WM. L. PATTERSON,
 WILLIAM V. MOORE.